UNITED STATES PATENT OFFICE.

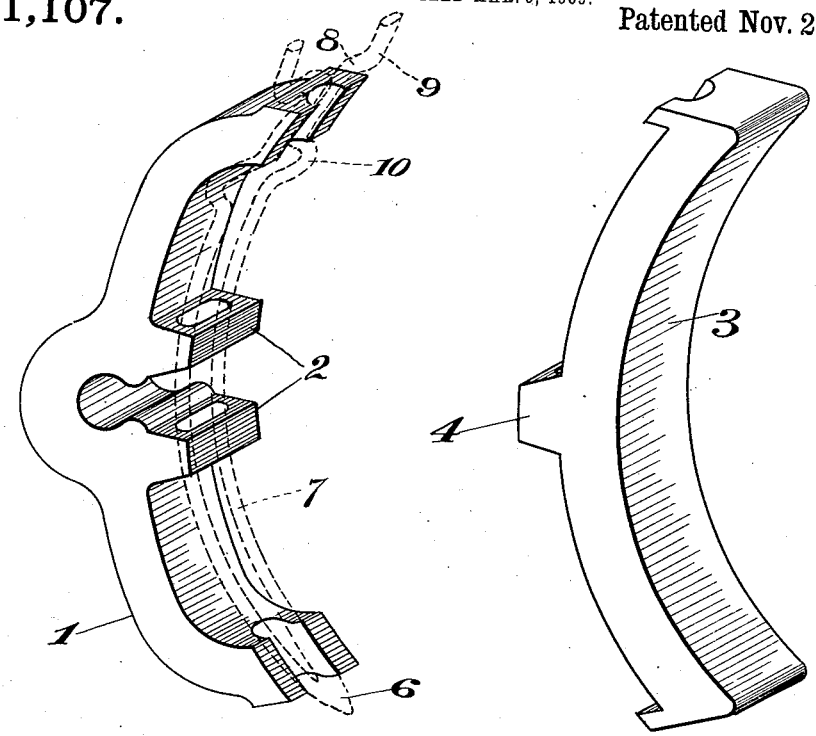

CHARLES NEAL SMITH, OF ST. THOMAS, ONTARIO, CANADA.

BRAKE-SHOE KEY.

941,107.  Specification of Letters Patent. Patented Nov. 23, 1909.

Application filed March 6, 1909. Serial No. 481,851.

*To all whom it may concern:*

Be it known that I, CHARLES N. SMITH, a subject of the King of Great Britain, residing at St. Thomas, county of Elgin, in the Province of Ontario, Canada, have invented certain new and useful Improvements in Brake-Shoe Keys; and I do hereby declare that the following is a full, clear, and exact description of the invention, such as will enable others skilled in the art to which it appertains to make and use the same.

The present invention relates to brake shoe keys, such as are adapted to removably secure a brake shoe to its head.

The main object of the present invention is to provide a key which will lock the shoe and head securely together and will not work out of place by vibration of the shoe, although it may be very readily driven into locking position and easily removed at will.

In order to more clearly disclose the construction, operation and use of the invention, reference should be had to the accompanying drawings forming part of the present application.

Throughout the several figures of the drawings, like reference characters designate the same parts.

In the drawings: Figure 1 is a perspective of the brake shoe head, with the key in position; Fig. 2 is a perspective of the brake shoe; Fig. 3 is a side view of the key; and, Fig. 4 is a plan view of the key.

The brake shoe head 1 is provided with two perforated lugs 2, and has recesses cut into its ends. The brake shoe 3 has a single lug 4, adapted to fit between the lugs 2 and provided with a perforation adapted to be alined with the perforations of the lugs 2. The ends of the brake shoe are notched to coöperate with the notched ends of the brake shoe head 1.

In order to lock the head and shoe together, a key 5 is provided. This key has the general outline of a long, tapering wedge with a solid point 6, and spring arm 7. The extreme upper ends of these arms are deflected to form abrupt shoulders 8 and finger grips 9. A short distance below the shoulders 8, the arms are stamped out or bent to form a second set of rounded shoulders 10. The shoulders 8 are adapted to rest upon the outer face of the end of the brake shoe head, while the shoulders 10 are adapted to rest against the upper face thereof. In this way, the shoulders 8 limit the insertion of the key, while the shoulders 10 prevent the withdrawal of the same.

The operation of the invention is as follows: The brake shoe 3 is placed in such position that the lug 4 lies between the lugs 2 and the perforations through said lugs are alined. The point of the key 5 is then passed through the notches in the brake shoe and brake shoe head and through the perforated lugs of the same until the shoulders 10 engage the end of the brake shoe head and brake shoe. The grips 9 are then grasped and the arms 7 forced together until the shoulders 10 may be passed through the notches in the brake shoe head and brake shoe. The key is then further inserted until the shoulders 8 engage the outer face of the end of the brake shoe head and the arms 7 are allowed to swing apart so that the shoulders 10 engage against the under face of the brake shoe head. Thus the brake shoe head and brake shoe will be solidly, though detachably, locked together, and the locking key will be secured against any possible movement.

It is clear that changes may be made in the construction, arrangement and disposition of the several parts of the invention, without in any way departing from the field and scope of the same, and it is meant to include all such within this application, wherein only a preferred form has been disclosed.

Having thus fully described my invention, what I claim as new, and desire to secure by Letters Patent, is:—

1. A brake shoe key of the character described, comprising a wedge-shaped member provided with spring arms each having a shoulder adapted to limit the insertion of the key, and a shoulder adapted to prevent accidental removal of the same.

2. A brake shoe key of the character described, comprising a wedge-shaped member provided with spring arms each having a shoulder adapted to limit the insertion of the key, and a second shoulder adapted to prevent accidental removal of the same.

3. A brake shoe key of the character described, comprising a wedge-shaped member having arms each provided with a shoulder adapted to prevent accidental removal of the key, and a second shoulder adapted to limit the insertion of the key, and a finger grip by which the arms may be drawn together to allow insertion.

In witness whereof I have hereunto set my hand in the presence of two witnesses.

CHARLES NEAL SMITH.

Witnesses:
GLADYS STANTON,
GEORGE W. LANGDEN.